Patented June 28, 1927.

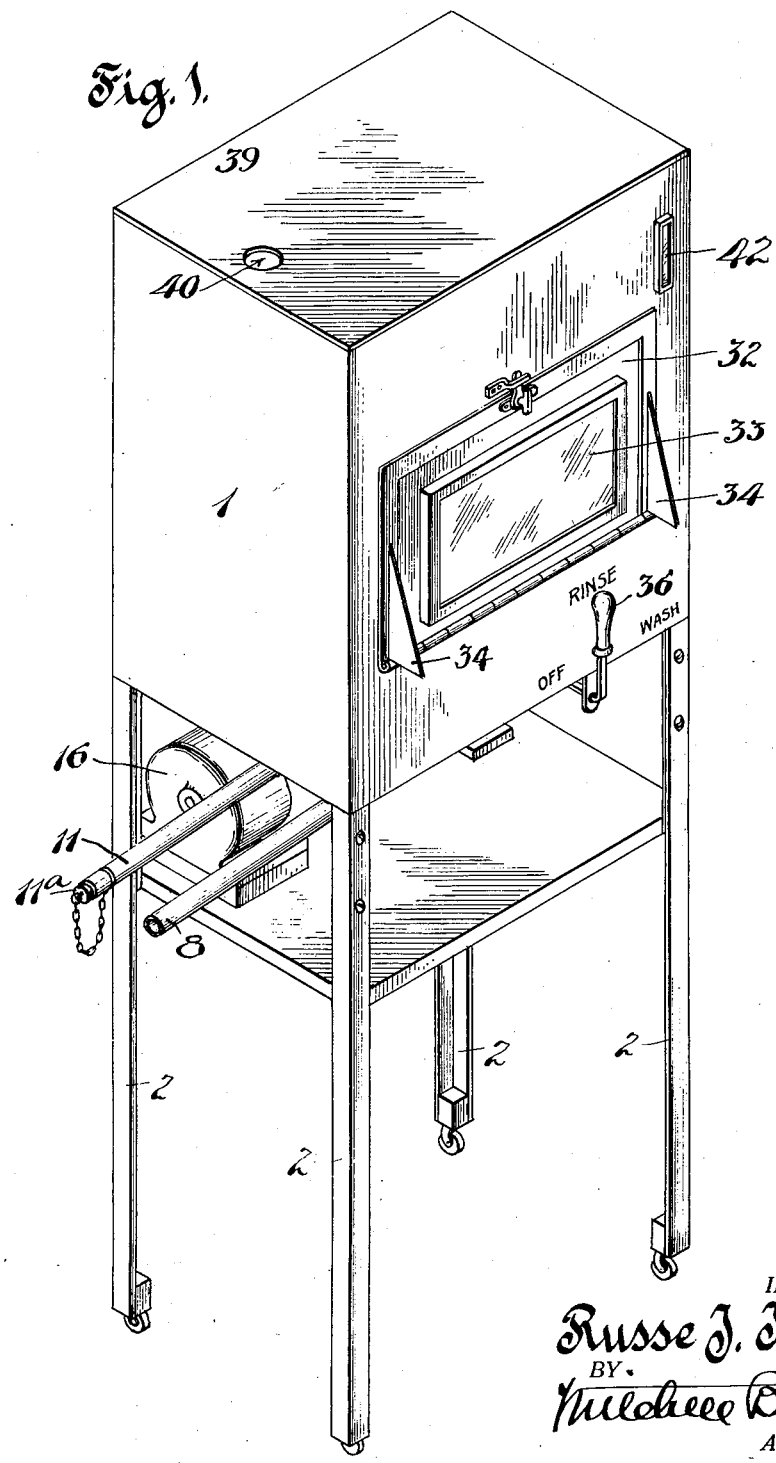

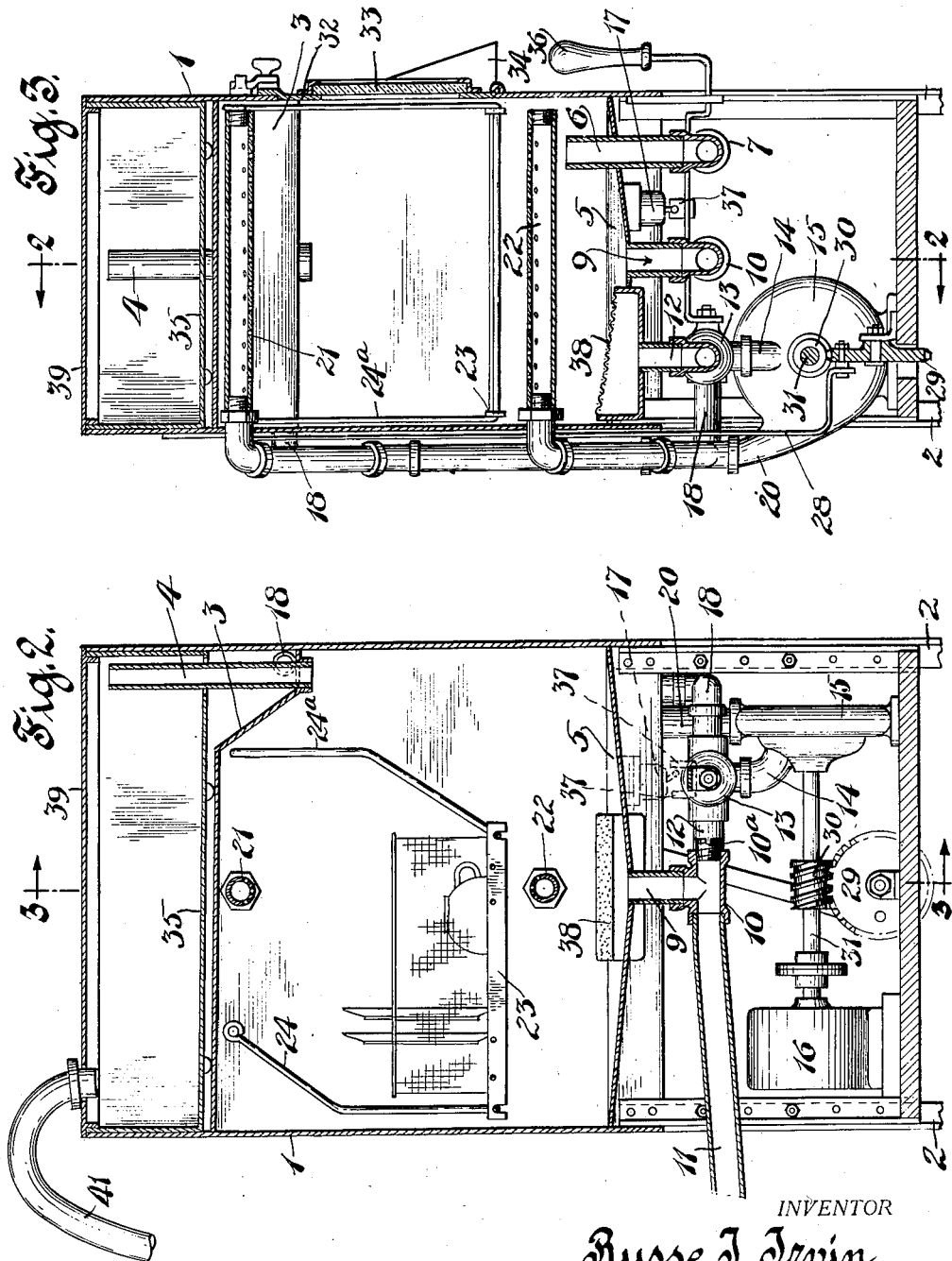

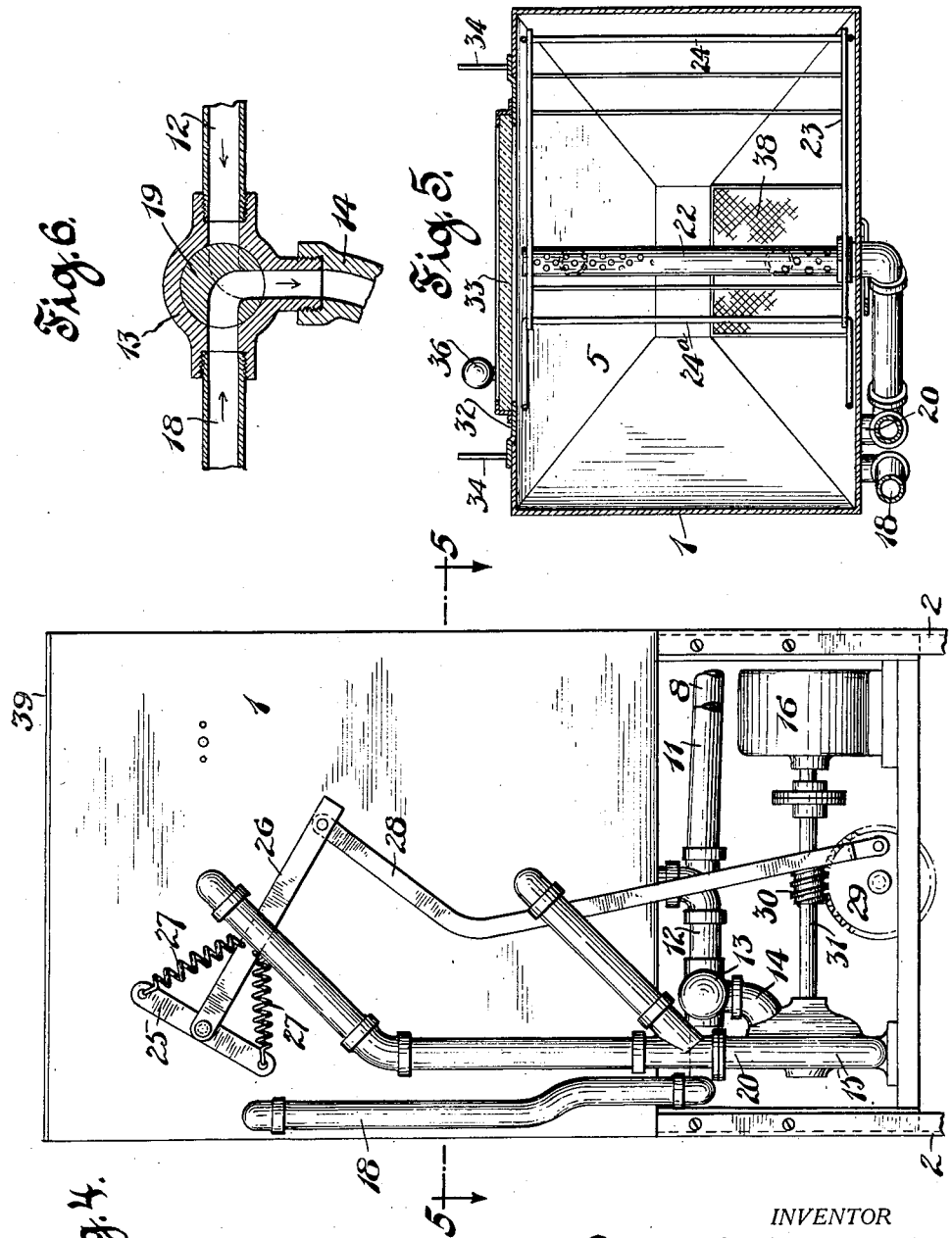

1,633,669

UNITED STATES PATENT OFFICE.

RUSSE J. IRVIN, OF MOUNT VERNON, NEW YORK, ASSIGNOR TO ROBERT C. MITCHELL, OF MOUNT VERNON, NEW YORK.

DISHWASHING MACHINE.

Application filed May 19, 1923. Serial No. 640,035.

My invention relates to dish washing machines, and particularly to a machine especially constructed and adapted for domestic use. Broadly speaking, the objects of the present invention contemplate simplicity of construction, compactness, and adjustability, whereby the machine is attachable to high or low sinks, or right or left-hand sinks, and will occupy very little space adjacent thereto. The above and other objects and advantages will appear from a reading of the specification.

In the accompanying drawings:

Figure 1 is a perspective view of the complete apparatus.

Figure 2 is a section on the line 2—2 of Figure 3.

Figure 3 is a section on the line 3—3 of Figure 2.

Figure 4 is an end elevation.

Figure 5 is a section on the line 5—5 of Figure 4.

Figure 6 is a section through the controlling valve and pipe leading thereto.

1 represents a housing mounted upon suitable legs 2—2, which latter are preferably connected to the housing as shown by suitable bolts, so that the apparatus may be raised and lowered to fit high or low sinks. Each leg may be made of two pieces overlapping and provided with a series of perforations, held together by means of bolts as shown in Figs. 2 and 4. 3 is a partition in the upper part of the housing 1, the space above said partition constituting a tank or reservoir for the water supply. 4 is an overflow pipe for said tank, the same being preferably mounted in said partition 3. The overflow from said tank is conducted down into the dish washing chamber of said housing, directly below partition 3. 5 represents the bottom of said washing chamber, which is also provided with an overflow pipe 6 to limit the level of water in said chamber. This pipe 6 is preferably provided with a T-piece 7 at its lower end, and 8 is a laterally directed discharge pipe which may be secured to either end of said T-piece so that overflow from the wash chamber may be discharged from either end of the machine as desired. The open end of the T-piece would of course be plugged. 9 is a drain pipe for the wash chamber which carries at its lower end a similar T-piece 10 and a discharge pipe 11. The plug for this T-piece 10 is shown at 10ª. 11ª is a stopper for the discharge pipe 11, and a similar stopper may be provided for the pipe 8 if desired. 12 is another pipe which leads from the wash chamber to a valve chamber 13. 14 is a pipe leading from said valve chamber to a pump 15, preferably of the centrifugal type. This pump 15 is suitably connected with a motor 16, which is preferably a small electric motor, which may be controlled by means of a suitable switch 17. I have not shown the electrical connections from the switch to the motor, as such connections are well known and no invention is claimed by me for such connections.

18 is another pipe leading from the valve chamber 13 to the water supply tank in the upper part of the housing 1. 19 is what is termed a "two-way" valve, mounted in the valve chamber 13. This valve, when it stands in one position, say that shown by solid lines in Fig. 6, will connect the water supply tank with the pump; and when it is thrown to another position, indicated by dotted lines in Fig. 6, it will connect the wash chamber with said pump. 20 is a delivery pipe connected with the pump 15 and having two branches which lead, respectively, to upper and lower spray pipes 21—22 fixed horizontally within the washing chamber, each pipe having suitable spray passages therein for directing fine high pressure streams of water powerfully against the articles that are to be washed.

The articles to be washed are supported on a suitable skeleton platform 23, said platform in turn being supported by two swinging yokes 24—24ª, pivotally supported in the opposite walls of the housing 1. The articles to be washed are ordinarily first packed in a wire mesh basket, conventionally illustrated in Fig. 2, the same being placed on the skeleton platform 23. The pivot of one of the swinging yokes (for example, 24) is provided with a suitable connection, whereby said yoke may be oscillated mechanically by the motor 16, for the purpose of swinging the articles to be washed from side to side within the washing chamber, whereby, with a relatively few number of spraying streams, the entire surface area of each and every piece to be washed will first be subjected to the powerful spraying action of the washing water and thereafter rinsed with clean water from the overhead tank as hereinafter described.

25 represents an arm, fixed intermediate its ends to one pivoted end of the yoke 24. 26 is another arm, which is freely pivoted on the pivotal center of the arm 25, and 27—27 are two springs which connect the arm 26 with the ends of the arm 25. The arm 26 is connected by a link 28 to a wheel 29, which is rotated by a worm 30 on the pump or motor shaft 31. By this form of connection the platform 23 is moved to and fro and the springs 27—27 act as a shock absorbing connection, thus minimizing any danger of breakage.

The front of the housing is provided with any suitable door 32, which may be provided with a window 33, whereby the washing operation may be observed. In the form shown the door 32 is hinged to the housing along its lower edge and is preferably constructed so as to be substantially water tight when closed. One or more shoulder pieces 34 may be provided on the door, to hold it horizontal when open. By opening this door a basket of dishes may be easily inserted into the washing chamber and placed upon the support 23 and removed therefrom when washed.

Within the overhead water supply tank, I provide a partition 35 (preferably removable), which is separated from the partition 3 by any suitable means and to an extent sufficient to provide a space between said partitions of a size sufficient to hold approximately that amount of water required for one single rinsing of the dishes contained in the single basket. In the particular form shown, this partition 35 has an opening or passage for the overflow pipe 4, which passage is slightly larger than said pipe, hence, any water contained in the tank above the partition 35 can flow into the space below said partition, at a predetermined speed limited by the size of this opening, said flow being much slower than the delivery capacity of the pump 15. Hence, by this simple expedient and without the necessity for any valve whatever, I provide an effective means for automatically measuring the amount of water required for each rinsing operation.

36 represents a handle, which is suitably connected with the valve 19. This handle connection is also provided with another connection of any suitable type, indicated conventionally by two arms 37—37, which function to throw the motor switch 17 "on" or "off." In the preferred construction, the pipe 12, which leads from the washing chamber to the pump, is provided with a suitable screen 38, to prevent refuse material from being drawn through the pump. This screen 38 is preferably of considerable area, so as to prevent choking up.

In Fig. 1 the drain pipe 9 and the overflow pipe 6 are arranged to discharge from the left-hand side of the machine. Obviously, if this is not a convenient place to discharge, these pipes may be applied to the T's at the opposite end, so that the discharge will be from the right-hand side of the machine.

39 represents a cover for the receptacle, which may have an opening 40 into which may pass the end of a hose 41, connected with a source of water supply.

42 is a gauge glass which may be provided to show the water level in the tank in the top of the housing.

*Operation.*—When the machine is idle, the operating handle 36 will stand in the position indicated by the word "Off" in Fig. 1. When in this position the motor switch will be thrown "off" so that the machine will be still. Water from any suitable source, such as a hot water faucet, will then be fed into the rinse water tank in the top of the housing 1, until it reaches the level of the overflow pipe 4, at which time the said tank will be full. The water supply will be continued until a sufficient quantity of water has overflowed into the washing chamber to raise the level of the water therein to the height of the overflow pipe 6 in the latter. The water supply is then shut off. A suitable quantity of detergent is then placed in the water in the washing chamber. The articles to be washed are then stacked in a basket and placed upon the swinging support 23. The door 32 is then closed. The operating handle 36 is then swung from the "off" position to the position indicated in Fig. 1 by the word "Wash." The operating handle may be connected in any suitable manner with a switch (not shown) for controlling an electric current to the motor 16 so that this movement of this single controlling lever will start the machine in operation by throwing the current on to the motor 16 and by putting the pump 15 in communication with the wash water in the washing chamber. The operation of the pump draws water from the washing chamber and forces it through the spray pipes 21, 22, so that the powerful streams will be directed against the articles then swinging to and fro in the zone of said spraying jets. As soon as one set of said articles has been properly washed (which takes but a comparatively few seconds), the operating handle 31 is moved to the position shown in Fig. 1, adjacent to the word "Rinse." This operates to shift the valve 19 to the position in which the water in the rinse tank between the partitions 3 and 35 will be put into communication with the pump, the wash water being cut off therefrom. As a result, a limited quantity of clean water is then forced through the pipes 21, 22, and the then washed articles will be thoroughly rinsed. The rinsing operation is completed in a very few seconds.

As before stated, the capacity of the pump to draw water from the chamber in the tank between the partitions 3 and 35 is so much greater than the flow of water through the communicating passage in partition 35, that the operator can quickly detect when the rinsing operation is completed, by the difference in the sound of the pump. When the rinsing is completed, the operating handle 36 is swung back to the "off" position, so that the moving parts stop, whereupon the door 32 may be opened, and the then clean articles may be removed and another basket of soiled articles may be quickly introduced, and the above operation repeated.

It will be noted that only one single control valve is needed; that all of the parts are accessible for cleansing or for any other purpose; that the construction is such that it may be placed conveniently at either end or side of a sink of any height, where a suitable hot water supply and waste is available. Further, it will be noted that there is a careful conservation of water, in that only that amount of water actually needed to effect a complete cleansing and rinsing is required. The water consumed in each rinsing operation is limited to that contained in the restricted space in the single overhead tank between the two partitions 3 and 35. This rinse water is, of course, added to the wash water in the washing chamber, and hence, if a large number of articles are to be washed, suitable additional detergent may be added to the water in the wash chamber from time to time as called for. The addition of this clean rinse water to the more or less soiled wash water in the wash chamber at each periodical washing performs the useful function of floating up and discharging through the overflow pipe 39 much of the greasy products removed from the dishes, thus maintaining the wash water supply in a wholesome and useful state, for a relatively long period.

It is preferable that when the current is turned off, the valve 19 should stand in a position to close the passage from the wash water chamber to the pump.

Whereas, in the prior art in machines of this character, it is common to employ a plurality of tanks and a large number of valves for individual control, it is noteworthy that in the present case I have produced a complete operative machine in which I employ only a single water supply tank and only a single valve, and that the operation of the machine requires no special skill or experience.

By my improved construction, the machine may be placed adjacent to either end of a sink where the space can best be afforded, and the discharge pipes 8 and 11 applied to the machine at the proper end to discharge into the sink, the legs 2—2 being adjustable as to height so that the machine will be adapted to the particular sink with which it is to be associated.

In practice, it is not only desirable to have the partition 35 within the tank removable to give access to all parts of said tank, but it is also desirable to have the screen 38 removable so that the well underneath the same may be thoroughly cleansed and so that the screen itself may be cleansed outside of the machine. This screen merely rests upon the upper edge of the well, as shown, and need not be locked in place.

I desire to have it understood that I have shown my improved dish washing machine in only one preferred form and that various changes in design, detail, and arrangement of parts may be made without departing from the spirit and scope of the invention.

In the preferred construction shown, when the operating handle 36 stands in the "off" position, the valve 19 will stand in a position to prevent water from flowing to the pump 15.

What I claim is:

1. A dish washing machine comprising a housing, a dish washing chamber in the lower part thereof, a combined supply and rinse water tank located above said washing chamber having an overflow communicating with said dish washing chamber whereby said chamber may be filled through said tank, a movable dish support within said chamber, spraying means within the chamber for directing jets of water against dishes placed on said support, a pump, means of connection between said pump and said washing chamber, and other means of connection between said pump and said rinse water tank, means for alternately connecting said pump with, and disconnecting it from, the other of said connections at will whereby water may be drawn from either the washing chamber or the rinse water tank as desired, and a connection from said pump to said spraying means whereby water drawn from either the washing chamber or rinse water tank may be forced through said spraying means for the purpose described, with means for limiting the amount of water freely drawn by said pump from said rinse water tank.

2. A dish washing machine comprising a housing having a chamber therein for containing dishes to be washed, a rinse water tank above said chamber having a gravity overflow pipe communicating with the latter, said overflow pipe discharging directly into said chamber, a pump, means of connection between said pump and said chamber, and between said pump and said tank for drawing water from said tank or said chamber at will, spraying means within said wash chamber, and another connection between said pump and said spraying means whereby water drawn into said pump from said chamber or rinse water tank may be forced through said spraying means.

3. In a washing machine, a housing, a washing chamber in the lower part of the same, an overflow pipe for limiting the high water level therein, a rinse water tank in said housing above said chamber, an overflow pipe in said rinse water tank leading down to said chamber for charging the latter with water through said rinse water tank, spraying means in the chamber, a dish support in said chamber above the level of the wash water therein, a pump, a connection between said pump and the lower part of the wash water chamber, another connection between said pump and the lower part of said rinse water tank, a valve for controlling said connections to put said pump in communication with either the rinse water tank or the washing chamber at will, a delivery pipe leading from the pump to the spraying means whereby wash water and clear rinse water may be successively forced against dishes on said support, and means for limiting the amount of rinse water that may be freely delivered to said pump from said rinse tank.

4. In a dish washing machine, a housing having a wash chamber therein for containing dishes to be washed, a support for said dishes, spraying means within said chamber, an overhead tank for containing a supply of rinse water, a partition in said tank forming a space below the same for holding a limited volume of water for a single rinsing operation, with a leak passage from the upper side of said partition to the lower side thereof, a pump, a connection from the wash chamber to said pump, another connection from the space in the rinse tank below said partition to said pump whereby water may be drawn from the latter by the pump, means for putting said pump in communication with either said wash chamber or said rinse tank, a delivery pipe from the pump to the spraying means, the capacity of the pump for drawing water being substantially greater than the capacity of said leak passage.

5. In a dish washing machine, a housing having a wash chamber therein, a swinging dish support within said housing, spraying means within said chamber, a rinse water tank in the upper part of said housing having an overflow communicating with said chamber, a pump, means of connection between said pump and said wash chamber, another means of connection between said pump and said rinse tank, with means for opening and closing said connections at will, a delivery pipe from the pump to the spraying means, a motor, means of connection between the motor and the pump and between the motor and said movable dish support whereby said pump and said movable dish support will operate simultaneously.

6. In a dish washing machine, a housing having a dish washing chamber in the lower part thereof for holding a supply of wash water, a drain outlet in the lowest part of said chamber, an overflow for limiting the high water level of the wash water in said chamber, means for supporting dishes to be washed in said chamber, spraying means within said chamber, a pump connected with said chamber and with said spraying means for drawing water from the former and forcing it through the latter, a rinse water tank mounted in the housing above the dish washing chamber, an overflow pipe in said rinse water tank communicating directly with the interior of said dish washing chamber, a connection between said pump and said rinse water tank, and a valve for putting said pump in operative communication with the water in the rinse water tank or the water in the dish washing chamber while still preserving the connection between the pump and the spraying means whereby dishes to be cleansed may be subjected to streams of wash water at one time and rinse water at another time.

7. In a dish washing machine, a housing having a dish washing chamber for holding a supply of wash water therein, a means for supporting dishes in said chamber, a drain outlet for the lowest part of said chamber, an overflow pipe for said chamber for limiting the high water level therein, a pump, a connection between said pump and the lower part of said chamber whereby the pump may draw wash water therefrom, a spraying means, a delivery pipe from the pump to the spraying means whereby said wash water may be forced through said spraying means, an overhead rinse water tank in communication with said chamber, and a connection between said pump and said tank whereby the former may draw rinse water from the latter and force the same through said spraying means, with a valve for putting said pump in communication with the wash chamber or the rinse tank at will, with adjustable extensions connected to said drain and to said overflow pipe, whereby water may be discharged from different sides of the machine as desired.

8. In a dish washing machine, a housing containing a dish washing chamber in the lower part thereof, a reciprocable dish supporting platform movable transversely therein, a door for said chamber in front of said platform, spraying devices above and below said dish support, a pump for forcing wash water in fine streams toward said dish supporting platform from above and below, a tank for containing clean rinse water located above said dish washing chamber, a connection between said tank and said dish washing chamber through which the dish washing chamber is initially charged, and another connection between said rinse water tank and said pump whereby clean rinse water may be forced through said spraying means at certain times, for the purpose described.

9. In a dish washing machine, a housing having therein a dish washing chamber and a rinse water tank above and communicating with said chamber, an overflow-pipe for the rinse water tank leading into said washing chamber and an overflow-pipe for said washing chamber, said overflows determining the high water level in said rinse tank and washing chamber, respectively, a drain from the washing chamber, a pump, a passage from the washing chamber into said pump, another passage from the pump to the interior of the washing chamber above the overflow-pipe, with spraying means at the end of said passage, means for holding dishes to be washed between said spraying means and for reciprocating the same to and fro, a connection between the rinse water tank and the pump, and means for putting the pump in communication with either the wash chamber or the tank at will to draw water therefrom, said means comprising a single valve.

RUSSE J. IRVIN.